(12) United States Patent
Simmons et al.

(10) Patent No.: US 9,295,198 B2
(45) Date of Patent: Mar. 29, 2016

(54) DENSITY SYSTEM BYPASS FOR A ROUND BALER

(75) Inventors: Scott C. Simmons, Lititz, PA (US); Filip Wijffels, Lotenhulle (BE); Michael J. Cooper, North Yorkshire (GB)

(73) Assignee: CNH Industrial America LLC, New Holland, PA (US)

( * ) Notice: Subject to any disclaimer, the term of this patent is extended or adjusted under 35 U.S.C. 154(b) by 522 days.

(21) Appl. No.: 13/467,132

(22) Filed: May 9, 2012

(65) Prior Publication Data
US 2013/0298787 A1    Nov. 14, 2013

(51) Int. Cl.
*A01F 15/08* (2006.01)
*A01F 15/18* (2006.01)
*A01F 15/07* (2006.01)

(52) U.S. Cl.
CPC ......... *A01F 15/0883* (2013.01); *A01F 15/0825* (2013.01); *A01F 15/18* (2013.01); *A01F 15/07* (2013.01)

(58) Field of Classification Search
CPC ..... A01F 15/0833; A01F 15/07; A01F 15/18; A01F 15/0825
USPC ................ 100/76, 87, 88, 89; 56/10.2 R, 341
See application file for complete search history.

(56) References Cited

U.S. PATENT DOCUMENTS

| | | | |
|---|---|---|---|
| 3,899,091 A | 8/1975 | Smith | |
| 4,288,971 A * | 9/1981 | McClure | 56/341 |
| 4,389,929 A | 6/1983 | Kluver et al. | |
| 4,391,187 A * | 7/1983 | Koning et al. | 100/88 |
| 4,545,298 A | 10/1985 | Viaud | |
| 4,698,955 A * | 10/1987 | Wagstaff | 56/341 |
| 4,870,812 A | 10/1989 | Jennings et al. | |
| 4,912,918 A * | 4/1990 | Jennings et al. | 56/341 |
| 5,025,717 A * | 6/1991 | Viaud et al. | 100/88 |
| 5,025,718 A | 6/1991 | Viaud et al. | |
| 5,263,410 A | 11/1993 | Olin | |
| 5,367,865 A | 11/1994 | Jennings et al. | |
| 5,622,104 A | 4/1997 | Viesselmann et al. | |
| 6,094,900 A | 8/2000 | Underhill et al. | |
| 6,272,825 B1 | 8/2001 | Anderson et al. | |
| 7,849,791 B2 * | 12/2010 | Smith | 100/88 |
| 2005/0247215 A1* | 11/2005 | Biziorek et al. | 100/87 |
| 2009/0223196 A1 | 9/2009 | Smith | |
| 2013/0020811 A1* | 1/2013 | Simmons et al. | 292/69 |
| 2013/0298786 A1* | 11/2013 | Simmons et al. | 100/76 |

FOREIGN PATENT DOCUMENTS

EP    0875136    * 11/1998 ............. A01F 15/07

* cited by examiner

*Primary Examiner* — Shelley Self
*Assistant Examiner* — Leonel Vasquez
(74) *Attorney, Agent, or Firm* — Patrick M. Sheldrake

(57) ABSTRACT

An improved belt tensioning system for an agricultural round baler that temporarily bypasses a bale density, belt tension increasing system while the baler tailgate is moved out of a closed position thereby allowing the tailgate to be opened without encountering resistance form the belts and the belt tensioning system. Bypass operation is coordinated with the tailgate position so that the bypass is not activated when such activation would frustrate operation of the belt tensioning system. In balers equipped with a belt tensioning pre-tensioning system, the bypass operation is further coordinated with the pre-tensioning system to maintain proper pre-tension function.

10 Claims, 6 Drawing Sheets

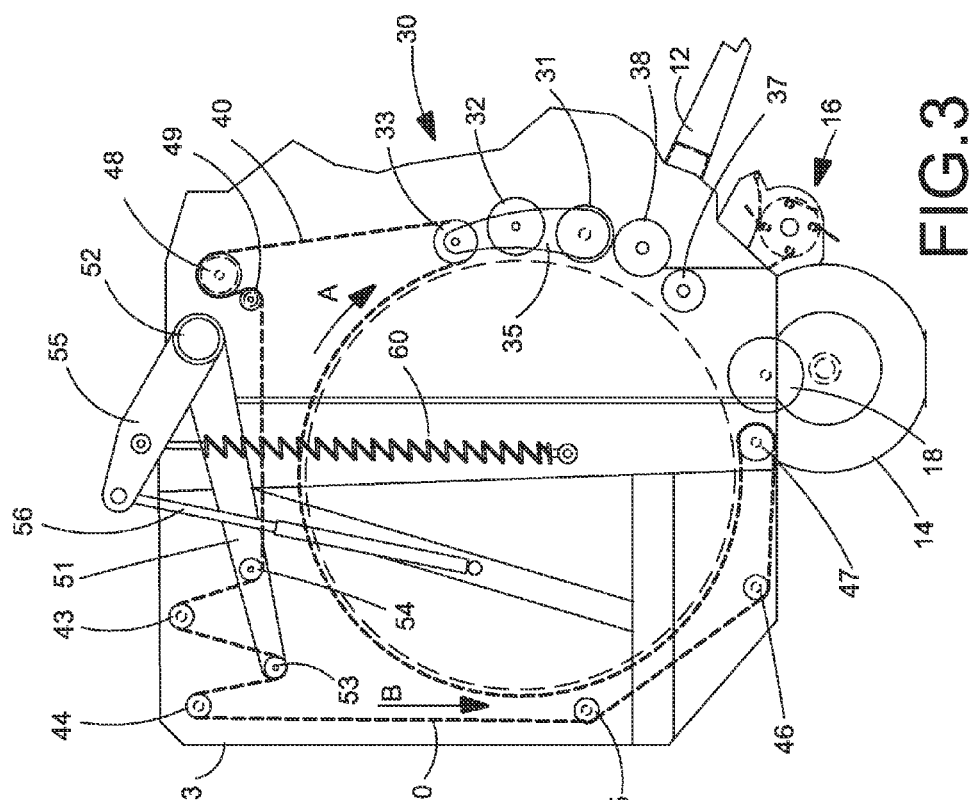
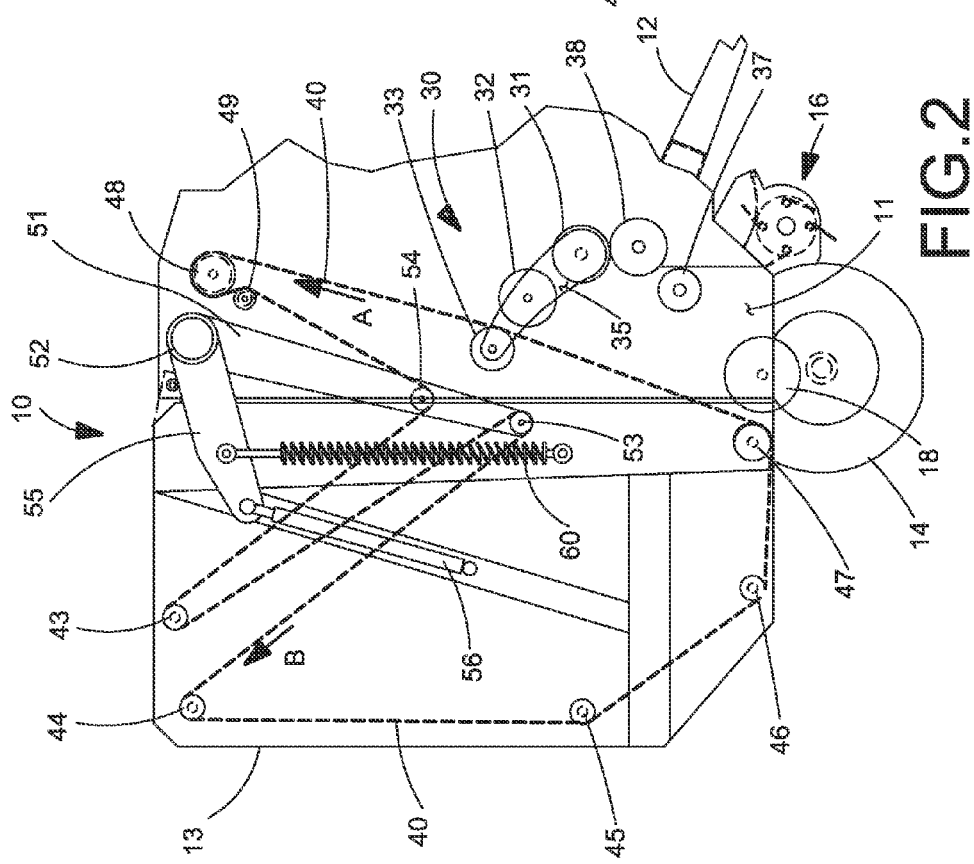

DENSITY SYSTEM BYPASS FOR A ROUND BALER

BACKGROUND OF THE INVENTION

The present invention relates generally to agricultural round balers which form cylindrical bales using one or more movable belts and/or rollers disposed in a bale-forming chamber and, more particularly to an improved system for tensioning the movable belts.

Round balers have become quite prevalent for their capability of producing a conveniently sized cylindrical bale, very often automatically wrapped with a sheeting material such as net or film. Crop material, such as hay, is picked up from the ground as the baler travels across the field, and is fed into an expandable chamber where it is rolled up to form a compact cylindrical hay package.

Prior art round balers generally have an expandable bale chamber defined by a pair of fixed sidewalls, and a plurality of side-by-side belts cooperating with a series of transverse rolls, mounted between a pair of pivotally mounted arms commonly known as a sledge. The chamber includes an inlet opening in the front through which crop material is fed. Also included is a pair of take up arms pivotally mounted on the main frame, between which arms multiple of guide rolls are journalled. A biasing force is applied on the take up arms to urge the outer surfaces of the guide rolls against the belts to maintain belt tension and prevent slack from occurring in the belts during expansion and contraction of the chamber.

It is known to provide a round baler density system to apply increased tension on the belts in order to create a densely packed bale. A hydraulic density cylinder with a controlled fluid release limits the rate of bale chamber expansion and provides a degree of crop compaction during baling. The amount of compaction may be varied by adjusting the fluid release rate, often in the form of a pressure relief valve which restricts the extension of the density cylinder by forcing fluid through a variable relief. When the bale reaches a desired size and is discharged, mechanical springs acting on the take up arms are typically employed to return the hydraulic cylinder to its initial position and provide a biasing force on the take up arms so a new bale forming cycle may commence.

Problems arise as the tailgate is opened in preparation to discharge the completed bale. The geometry of the belt take-up system requires some slack in order to open the tailgate and discharge the bale. If the density system is resisting slackening movement of the belts during tailgate opening, the tailgate opening apparatus must overcome not only the force necessary to lift the tailgate, but the resistive force applied to further extension of the belt take-up mechanism. This results in increased power input required during the tailgate opening sequence, and skewing of the tailgate and belts.

It would be desirable to provide a system that would release the resistive force applied on the belts by the bale density system when the tailgate is released for opening. Additional advantages would be realized by a system that would automatically release the resistive force based on positioning of the tailgate latching system and restore the bale density to a normal operation configuration once the tailgate is fully opened or begins to close. Still further advantages would be realized by a density system release mechanism that could be easily incorporated into existing baler density systems with minimal alteration of the existing bale density tensioning system.

SUMMARY OF THE INVENTION

Accordingly, the present invention, in any of the embodiments described herein, may provide one or more of the following advantages:

It is an object of the present invention to provide an improved bale tensioning system for an agricultural round baler that includes an automatic bypass feature for disengaging the bale tensioner system during tailgate opening.

It is a further object of the present invention to provide an improved agricultural round baler belt tensioning system having a closed-loop hydraulic tensioner apparatus with a hydraulic bypass loop that may be selectively opened upon an input signal from a tailgate opening system on the baler.

It is a further object of the present invention to provide an improved hydraulic belt tensioning system with a bypass arrangement for an agricultural round baler that enables efficient tailgate operation without imposing additional opening loads or increasing tailgate stresses due to forces generated by the belt tensioning system.

It is a further object of the present invention to provide an improved hydraulic bale density system with an automatic, selective bypass for an agricultural round baler that is easily retrofitted onto existing round balers having bale density systems.

It is a still further object of the present invention to provide an improved hydraulic bale density system for an agricultural round baler, the density system having an automatic bypass that is durable in construction, inexpensive of manufacture, carefree of maintenance, easily assembled, and simple and effective to use.

These and other objects are achieved according to the instant invention by providing an improved belt tensioning system for an agricultural round baler that allows temporarily bypasses a bale density, belt tension increasing system while the baler tailgate is moved out of a closed position thereby allowing the tailgate to be opened without encountering resistance from the belts and the belt tensioning system. Bypass operation is coordinated with the tailgate position so that the bypass is not activated when such activation would frustrate operation of the belt tensioning system. In balers equipped with a belt tensioning pre-tensioning system, the bypass operation is further coordinated with the pre-tensioning system to maintain proper pre-tension function.

BRIEF DESCRIPTION OF THE DRAWINGS

The advantages of this invention will be apparent upon consideration of the following detailed disclosure of the invention, especially when taken in conjunction with the accompanying drawings wherein:

FIG. 2 is a side section view of the round baler of FIG. 1 showing a bale forming chamber configured at the beginning of a bale forming cycle;

FIG. 3 is a side view of the agricultural round baler in FIG. 1 in which the bale forming chamber is configured as it would be near the end of a bale forming cycle;

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
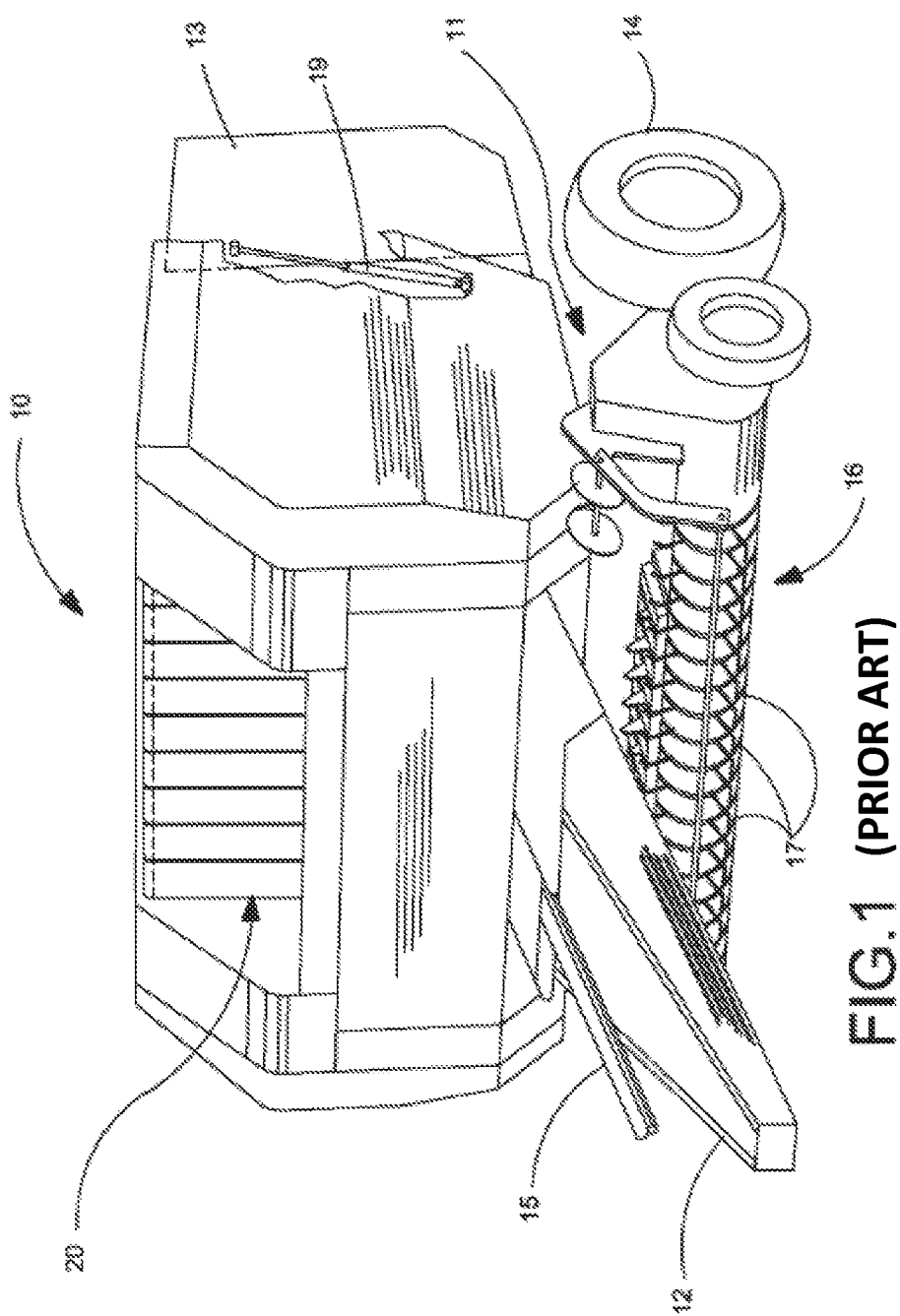
FIG. 1 is a perspective view of a typical agricultural round baler on which the present invention is useful.

Referring to the figures, a generally well-known round baler 10 which incorporates the preferred embodiment of the present invention, includes a main frame 11 supported by a pair of wheels 14 (only one shown). A tongue 12 is provided for connection to a tractor. Pivotally connected to the sides of main frame 11 is tailgate 13 which may be closed (as shown in FIG. 1) during bale formation or pivoted open by tailgate actuator 19 to discharge a completed bale. A conventional pickup 16, mounted on main frame 11, includes a plurality of tines 17 movable in a predetermined path to lift crop material from the ground and deliver it rearwardly toward a rotatably mounted floor roll 18.

A chamber 20 for forming bales is defined partly by a sledge assembly 30 comprising a plurality of rollers 31, 32 extending transversely in the arcuate arrangement shown in FIGS. 2 and 3. Rollers 31, 32 are journalled at their ends in a pair of spaced apart arms 35, one of which is shown. These arms are pivotally mounted inside main frame 11 on stub shafts for providing movement of sledge assembly 30 between the bale starting position shown in FIG. 2 and the full bale position shown in FIG. 3. Rollers 31, 32 are driven in a clockwise direction by conventional means (i.e., chains and sprockets or gears) connected to and powered by a prime mover via a drive shaft 15. A freely rotatable idler roller 33 is also carried by arms 35. Additionally, a starter roll 37, and a fixed roll 38 are located adjacent to roller 31, and are also driven in a clockwise direction by the conventional means.

The bale forming chamber is further defined by an apron 40 comprising a plurality of continuous side-by-side belts supported by guide rolls 43, 44, 45, 46, 47 rotatably mounted in tailgate 13 and a drive roll 48, mounted on main frame 11. Apron 40 passes between roller 32 on sledge assembly 30 and idler roller 33, and is in engagement only with idler roller 33 and not roller 32 which is located in close proximity to the apron belts to strip crop material from the belts, in addition to its bale forming function. Drive roll 48 is powered via a power take-off from the tractor and a drive train (not shown) which moves apron 40 along its changing path, indicated generally by arrows A and B in FIGS. 2 and 3. An additional guide roll 49 ensures proper driving engagement between apron 40 and drive roll 48.

A pair of take up arms 51 (only one shown) are mounted to pivot conjointly with a cross shaft 52 between inner and outer positions, shown in FIGS. 2 and 3, respectively, and carry additional guide rolls 53, 54 for supporting apron 40. Belt tension lever arm 55 is also affixed to shaft 52 to pivot with take up arms 51. A return spring 60 is secured between the baler chassis 11 and tension lever arm 55 to bias the shaft 52 and take up arms 51 toward the bale starting position (shown in FIG. 2) and move the take up arms toward the bale starting position following ejection of a completed bale. A hydraulic bale tension cylinder 56 is mounted between tailgate 13 and take up arms 51 and configured to resist movement of the take up arms from the bale starting position (FIG. 2) toward the full bale position (FIG. 3).

Rounds balers including belt take-up and tensioning apparatus of the aforementioned type are well known in the art. Exemplar take-up apparatus are described in U.S. Pat. Nos. 4,870,812 and 5,367,865, both to Jennings et al., each being incorporated herein by reference.

Figure 4:
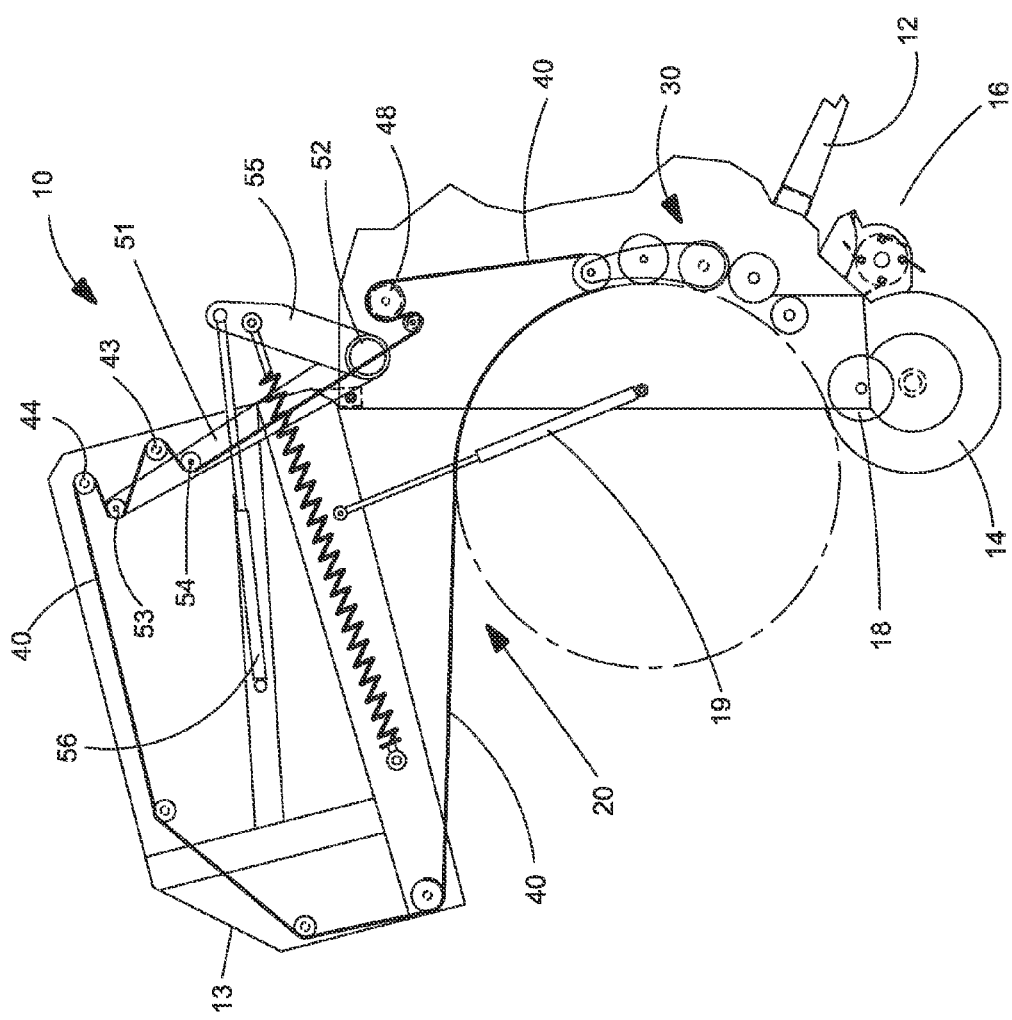
FIG. 4 is a side view of the agricultural round baler in FIG. 1 in which the tail gate is opened in preparation to discharge a completed bale from the bale forming chamber.

FIG. 4 shows the baler 10 with tailgate 13 in the raised or open position as would be necessary to eject a completed bale from the bale forming chamber 20. The relationship of the tailgate 13, apron 40 and its rolls, and take up arms 51 is such that additional extension of bale tension cylinder 56 beyond that required for a full bale is necessary to raise the tail gate to an open position as shown in FIG. 4. The normal resistance to extension that tension cylinder 56 applies to take up arms 51 thus creates resistance to opening of the tailgate.

Figure 5:
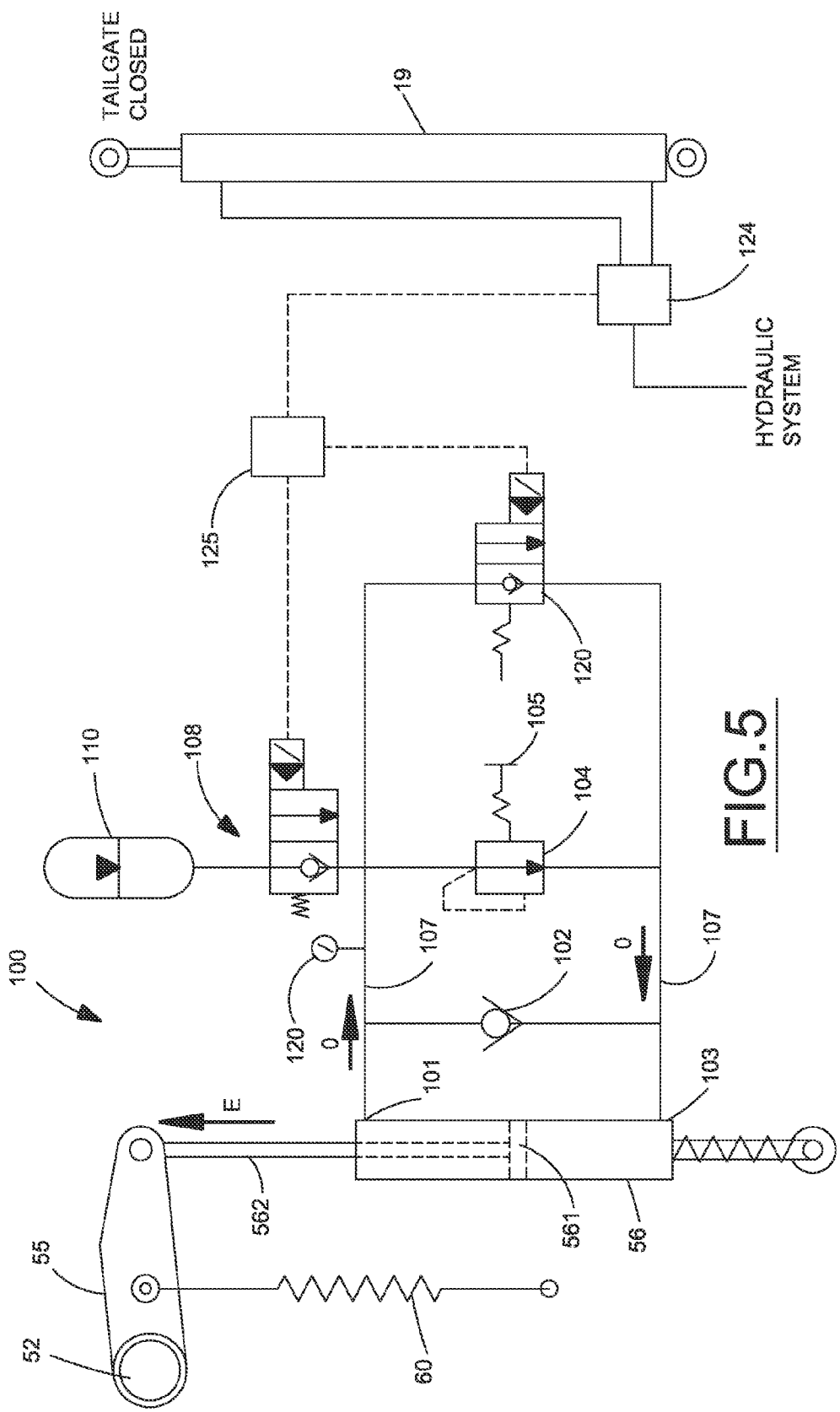
FIG. 5 is a diagrammatic view of a bale tension system incorporating the present invention shown configured as it would be during the initial bale formation in the chamber.
Figure 6:
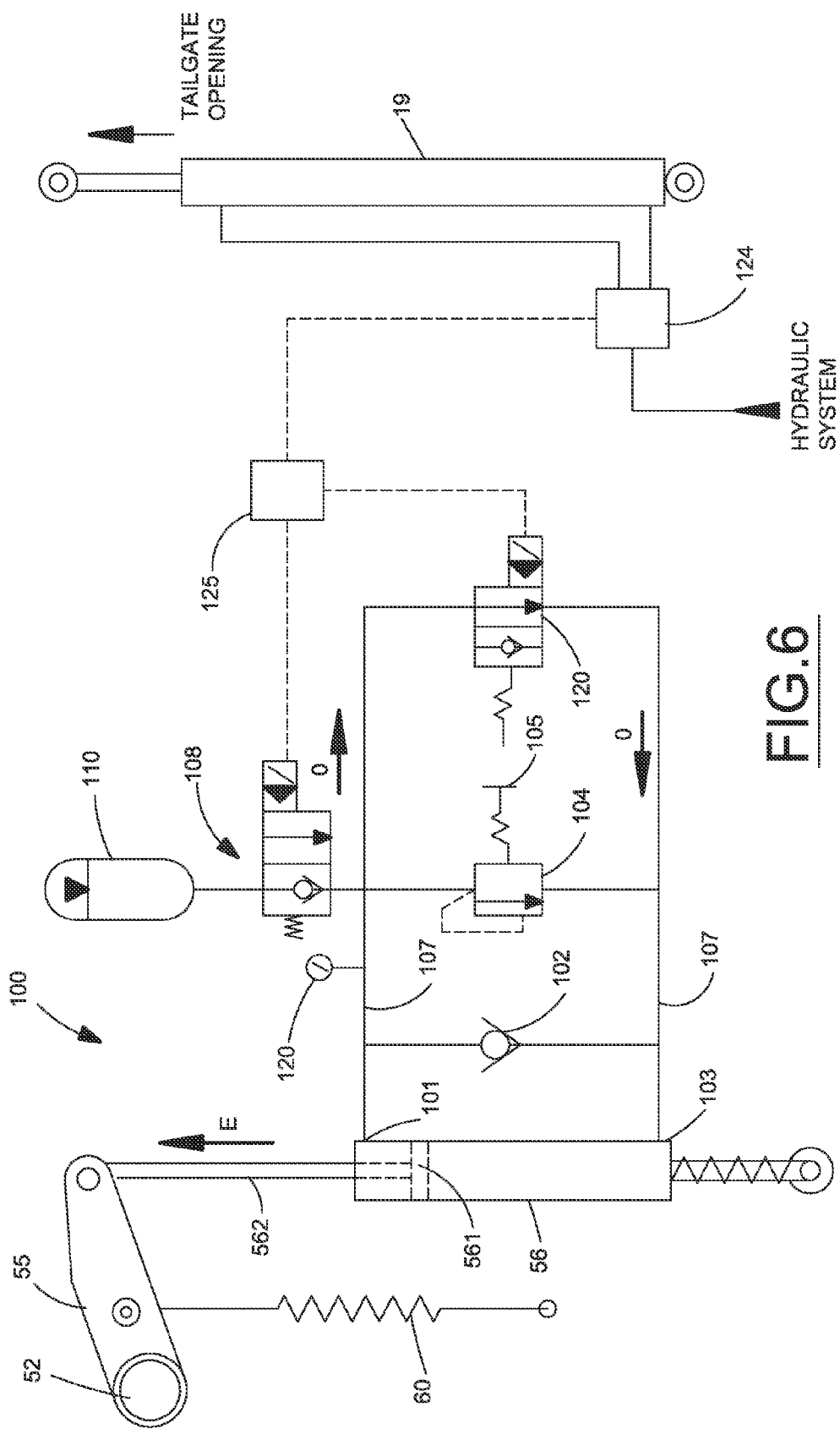
FIG. 6 is a diagrammatic view of a bale tension system incorporating the present invention shown configured as it would be as the bailer tailgate is being opened in preparation to eject the completed bale from the bale forming chamber.
Figure 7:
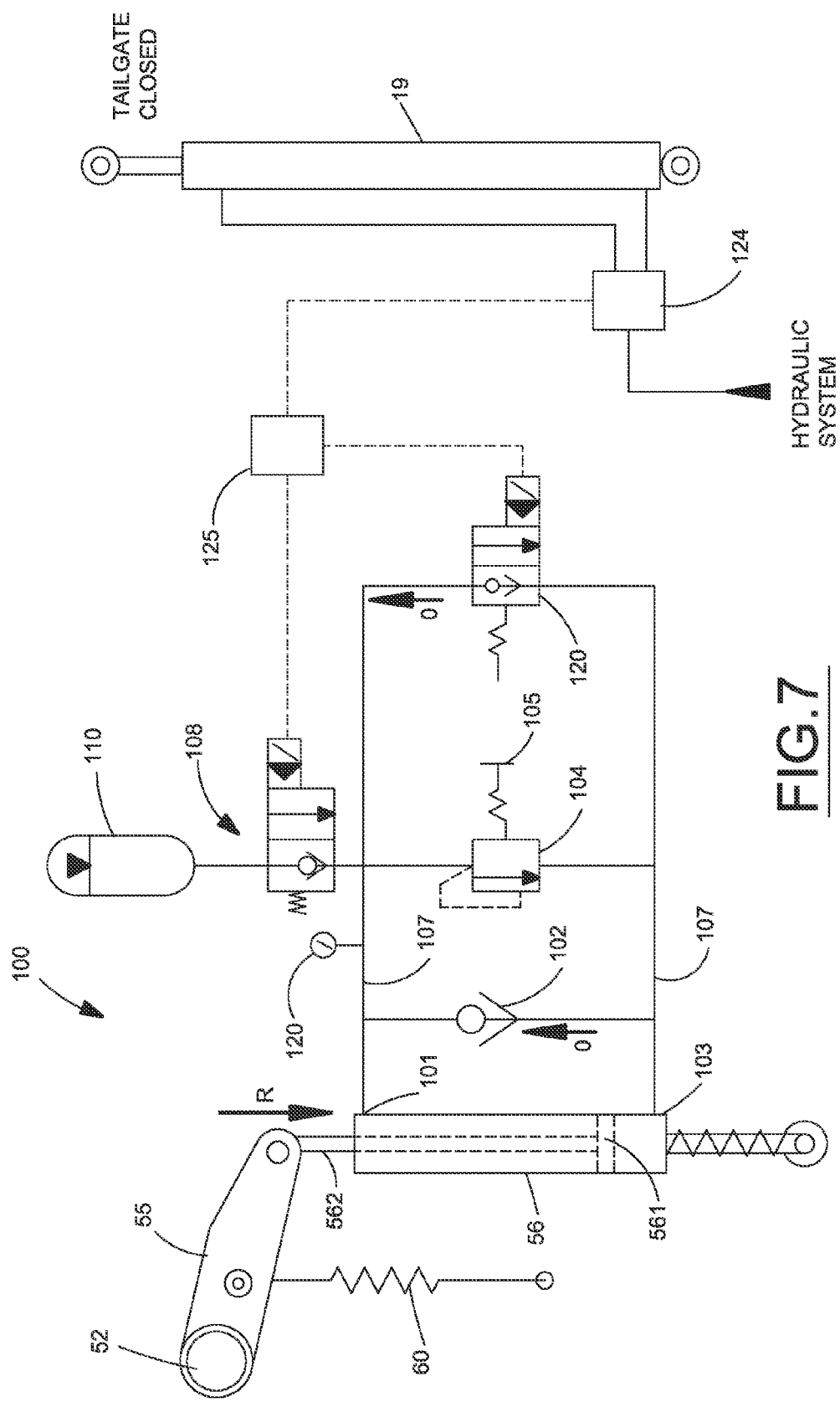
FIG. 7 is a diagrammatic view of a bale tension system incorporating the present invention shown configured as it would be after the bale has been ejected from the bale forming chamber, the belt tension arms are retracting, and the tailgate is closing.

Now turning to FIGS. 5 through 7 to describe in further detail the tensioning system 100 bypass arrangement at the heart of the present invention. The elements are shown as the bale formation is in progress in FIG. 5, as the bale has reached a fully-formed diameter and the tailgate is being opened in FIG. 6, and as the tailgate is being closed and the bale chamber returns to the empty, ready to begin bale formation position in FIG. 7.

Apron tensioning system 100 comprises a closed hydraulic loop including the hydraulic tension cylinder 56 acting on the take up arms 51 via belt tension lever arms 55. The apron tensioning system is hydraulically separate from the active hydraulic system used to open and close the tailgate 13 using tailgate actuator 19. The hydraulic system includes hoses 107 supplying fluid to both high-side 101 (rod end) and low-side 103 (base end) sides of a piston 561 mounted on a rod 562 in cylinder 56, an adjustable relief valve 104 with a return free flow check valve 102. A pre-tension accumulator reservoir 110, if included, is connected to the hose 107 by a solenoid-operated check valve 108 that allows selective reverse flow through the valve. The accumulator reservoir 110 is preferably a conventional gas-charged hydraulic accumulator with provisions for altering the gas pressure. A pressure indicator 120 is provided to allow an operator to adjust the relief valve 104 by an adjuster 105 to a desired pressure in the system 100 corresponding to a desired density of the resultant bales. A bypass valve 120 is provided in parallel around the high-side 101 and low-side 103 of the tension cylinder. In one embodiment, bypass valve is a two-way solenoid valve offering an open port in the first position and a check valve in the second position, similar to the solenoid-operated check valve 108. The check valve is arranged to provide a return flow path in parallel with return free flow check valve 102. Alternatively, the bypass valve 120 could be provided with a simpler open flow port and a closed port corresponding to the two positions.

In FIG. 5, hydraulic fluid is forced from the high-side connection 101 into hoses 107 as the tension cylinder is extended in the direction of arrow E and the bale forms in the bale chamber. As the bale expands, tension cylinder 56 continues extending in the direction of arrow E, continuing to force fluid into the system from the high-side 101 connection increasing pressure therein. Hydraulic pressure in system 100 increases to the selected pressure setting of relief valve 104 which then allows fluid to pass from the high side 101 to the low-side 103 connection of the tension cylinder 56. This continues until the bale reaches the desired size.

FIG. 6 shows the baler as it prepares to eject the bale. Tailgate lift cylinder 19 is activated by tailgate control valve 124 to extend the cylinder 19 and open the tailgate. A control module 125 coordinates control signals to the bypass valve 120 and tailgate control valve 124 so that the bypass valve 120 is shifted to the bypass position when the tailgate as the tailgate is opened, allowing fluid to move freely from the high side 101 to the low side 103 of tension cylinder 56, avoiding the restriction normally created by flow through the relief valve 104. Control logic for the bypass valve 120 also prevents the opening of solenoid-operated check valve 108 on systems equipped with a pre-tension apparatus to prevent blow down of the accumulator reservoir 110 to the low side 103 of tension cylinder 56.

Referring to FIG. 7, return spring 60 returns the belt tension lever arms 55 to the empty, or bale initiating position, and retracts tension cylinder 56 in the direction of arrow R after the bale is discharged and the tailgate is closed. Hydraulic fluid pressure is now higher on the base end 103 than the rod end 101. Return check valve 102 allows fluid to pass from the higher pressure base end 103 to the lower pressure rod end 101 (oil flow arrows 0) so that the tension cylinder 56 may be retracted. Control logic in the control module 125 takes inputs from the positioning of the tailgate control valve 124 and the tailgate position to determine the timing of bypass valve 120 re-positioning. In systems equipped with a pre-tensioning booster system (e.g., accumulator 110 and solenoid operated check valve 108), the bypass valve 120 must be repositioned prior to opening of the check valve 108 to prevent the accumulator charge pressure from being directed to extend the tension cylinder.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. An agricultural round baler comprising:
a main frame;
a bale forming chamber supported by said main frame and defined in a space between opposing side walls by a plurality of side-by-side continuous belts trained around a plurality of transversely elongate guide rollers including fixed rollers and at least one moveable roller, said bale forming chamber configured to form a generally spirally wound, cylindrically shaped bale of increasing diameter oriented transverse to said frame by motion of said plurality of belts and rotation of said plurality of guide rollers;
a tailgate operably connected to the main frame and movable by a tailgate actuator between open and closed positions for allowing a formed bale to be ejected from said bale forming chamber;
a tension arm pivotally moveable between opposing empty and full positions and having a return spring to bias said tension arm toward said empty position, said at least one moveable roller connected thereto for movement therewith; and
a bale tensioner comprising a hydraulic cylinder having first and second pressure sides, a closed-loop hydraulic circuit connecting said first and second pressure sides, a pressure setting device for setting a first pressure in said hydraulic circuit, and a bypass circuit around said pressure setting device which is selectively l when engaged mables unrestricted hydraulic fluid flow between said first and said second pressure sides;
wherein the bale tensioner is connected to said tension arm and moveable between generally opposing first and second positions as said tension arm moves between said empty and full positions, movement of said bale tensioner from said first position toward said second position resisting movement of said tension arm toward said full position to maintain tension in said plurality of belts as said bale increases in diameter; and
wherein the bypass circuit allows unrestricted hydraulic fluid flow between said first and said second pressure sides when the tailgate is moved from the closed position to an open position.

2. The round baler of claim 1, wherein said bale tensioner hydraulic circuit is hydraulically separate from said tailgate actuator.

3. The round baler of claim 2, wherein the bypass circuit comprises a bypass control valve having a first alignment allowing unrestricted hydraulic fluid flow therethrough and a second alignment restricting hydraulic fluid flow.

4. The round baler of claim 3, further comprising a controller configured to receive a position input signal indicative of said tailgate position and generate an output signal to manage alignment of said bypass control valve, said controller aligning said bypass control valve to said second alignment when said tailgate is closed and aligning said bypass control valve to said first alignment when said tailgate is not closed.

5. The round baler of claim 4, further comprising a pre-tensioning device having a pressure accumulator connected to said hydraulic circuit by a pretension control valve, said pre-tensioning device selectively acting on said bale tensioner to apply a bias increasing force on said tension arms toward said empty position thereby increasing tension in said plurality of belts to a tension greater than the tension applied by said return spring, said controller being further configured to cooperatively manage alignment of said bypass control valve and said pre-tension control vale.

6. A tensioning apparatus for an agricultural round baler, the baler having a main frame supporting a bale forming chamber defined in a space between opposing side walls by a plurality of side-by-side continuous belts trained around a plurality of transversely elongate guide rollers including fixed rollers and at least one moveable roller, the bale forming chamber configured to form a generally spirally wound, cylindrically shaped bale of increasing diameter oriented transverse to the frame by motion of the plurality of belts and rotation of the plurality of guide rollers, and a tailgate operably connected to the main frame and movable by a tailgate actuator between open and closed positions for allowing a formed bale to be ejected from the bale forming chamber, said tensioning apparatus comprising:
- a tension arm pivotally moveable between opposing empty and full positions and having a return spring biasing said tension arm toward said empty position, the at least one moveable roller connected thereto for movement therewith; and
- a hydraulic bale tensioner comprising a hydraulic cylinder having first and second pressure sides, a closed-loop hydraulic circuit connecting said first and second pressure sides, a pressure setting device for setting a first pressure in said hydraulic circuit, and a bypass circuit around said pressure setting device that is selectively engageable and when engaged enables unrestricted hydraulic fluid flow between said first and said second pressure sides;
- wherein the bale tensioner is connected to said tension arm and moveable between generally opposing first and second positions as said tension arm moves between said empty and full positions, movement of said bale tensioner from said first position toward said second position resisting movement of said tension arm toward said full position to maintain tension in said plurality of belts as said bale increases in diameter; and
- wherein the bypass circuit allows unrestricted hydraulic fluid flow between said first and said second pressure sides when the tailgate is moved from the closed position to an open position.

7. The tensioning apparatus of claim 6, wherein said bale tensioner hydraulic circuit is hydraulically separate from said tailgate actuator.

8. The tensioning apparatus of claim 7, wherein the bypass circuit comprises a bypass control valve having a first alignment allowing unrestricted hydraulic fluid flow therethrough and a second alignment restricting hydraulic fluid flow.

9. The tensioning apparatus of claim 8, further comprising a controller configured to receive a position input signal indicative of said tailgate position and generate an output signal to manage alignment of said bypass control valve, said controller aligning said bypass control valve to said second alignment with said tailgate is closed and aligning said bypass control valve to said first alignment when said tailgate is not closed.

10. The tensioning apparatus of claim 9, further comprising a pre-tensioning device having a pressure accumulator connected to said hydraulic circuit by a pretension control valve, said pre-tensioning device selectively acting on said bale tensioner to apply a bias increasing force on said tension arms toward said empty position thereby increasing tension in said plurality of belts to a tension greater than the tension applied by said return spring, said controller being further configured to cooperatively manage alignment of said bypass control valve and said pre-tension control vale.

* * * * *